Patented Aug. 2, 1949

2,478,036

UNITED STATES PATENT OFFICE 2,478,036

VULCANIZATION OF BUTADIENE COPOLYMER RUBBERS BY MEANS OF HALOGENATED ALIPHATIC HYDROCARBONS

Arthur A. Baum, Wilmington, Del., assignor to E. I. du Pont de Nemours & Company, Wilmington, Del., a corporation of Delaware No Drawing. Application August 6, 1946, Serial No. 688,689

10 Claims. (Cl. 260—83.3)

This invention relates to the vulcanization of butadiene copolymer rubbers. The invention relates more particularly to a process of vulcanizing butadiene copolymer rubbers by means of halogen containing aliphatic hydrocarbons.

It is an object of this invention to provide an improved process for vulcanizing butadiene copolymer rubbers. Another object of the invention is to provide a process whereby butadiene copolymer rubbers can be vulcanized in the absence of sulfur. A still further object is to provide vulcanized copolymer rubbers having improved properties.

By butadiene copolymer rubbers, is meant polymers having rubber-like properties which are produced by the copolymerization of butadiene with one or more copolymerizable vinyl compounds such as styrene or acrylonitrile, the butadiene being present in the mixture to the extent of from 50% to 98% of the total polymerizable material. The butadiene-styrene copolymer rubbers are manufactured commercially under such names as GR-S, GR-S-10, GR-S-25, GR-S-50 and the like which are the designations given to this type of rubber by the U. S. government, while the butadiene-acrylonitrile copolymer rubbers are manufactured under such names as "Buna N," "Hycar OR," "Perbunan" and "Chemigum." The vulcanization of butadiene copolymer rubbers is usually carried out by heating them with sulfur in the presence of certain organic and inorganic accelerators. While the vulcanizates thus produced are satisfactory for many uses, they are unsatisfactory for others due to deficiencies in certain physical properties. For example, sulfur vulcanizates of these polymers are known to have quite poor resistance to heat aging. They tend to become short and brittle and unserviceable after only a relatively short time at elevated temperatures. This tendency serves to limit the usefulness of butadiene copolymer rubbers where elevated temperatures are encountered.

The use of sulfur as a vulcanizing agent for these polymers has been very thoroughly investigated, and a vast number of combinations of sulfur, metal oxides and accelerators have been tried. The desired improvements in vulcanizate properties have not been obtained by this means, however. In fact, it appears that some of the properties, such as age-resistance, particularly at elevated temperatures, are adversely affected by sulfur itself.

It is therefore highly desirable to provide an improved method of vulcanizing butadiene copolymer rubbers, and particularly one in which sulfur is not used, which will give vulcanizates having somewhat different properties than those of sulfur vulcanizates and which especially will show improved resistance to aging.

We have now found that butadiene copolymer rubbers can be vulcanized by the use of aliphatic hydrocarbons containing at least one —$CX_3$ group, in which X represents chlorine, bromine or iodine. These halogen containing hydrocarbons effect vulcanization in the complete absence of sulfur, and, in fact, their action is greatly retarded by the presence of sulfur. Although when used by themselves these halogen containing hydrocarbons do not effect vulcanization to any appreciable extent, they are strongly activated by certain metal oxides, particularly litharge, and in such combination will produce valuable vulcanizates. These compounds represent a new type of vulcanizing agent which is radically different from any of the substances previously found to vulcanize either natural or synthetic rubber. By the use of these halogen containing hydrocarbon vulcanizing agents, vulcanizates can be obtained which are generally equal to, and in some properties superior to, those normally produced by sulfur vulcanization.

In example 1 is listed a variety of halogen containing aliphatic hydrocarbons, all containing the —$CX_3$ group in which X is chlorine, bromine or iodine, which act as vulcanizing agents for butadiene copolymer rubbers.

EXAMPLE 1

The following stocks were mixed on a rubber mill, using standard procedure:

*Stock*

| | |
|---|---|
| GR-S[1] | 100 parts |
| Medium processing carbon black | 50 parts |
| Vulcanizing agent | As indicated |
| Metal oxide | As indicated |

[1] GR-S is the name of the butadiene copolymer rubber made in government plants by the copolymerization of butadiene and styrene.

Each mix was vulcanized at 60 p. s. i. steam pressure for the length of time indicated in the table, then the stress-strain characteristics of the resulting vulcanizates were determined. Results of these tests were as follows: $M_{300}$ refers to stress in lbs./sq. in. at 300% elongation; $T_B$ refers to tensile strength at break in lbs./sq. in.; $E_B$ refers to per cent elongation at break.

Example 2 illustrates that other halogen containing aliphatic hydrocarbons, which do not possess a —$CX_3$ group as above defined, are not effective as vulcanizing agents for butadiene copolymer rubbers.

EXAMPLE 2

The process of Example 1 was repeated, using

*Table I*

| Vulcanizing Agent | Parts | Parts Metal Oxide | Vulcanization Time, Min. | $M_{300}$ | $T_B$ | $E_B$ |
|---|---|---|---|---|---|---|
| 1,1,1,3-Tetrachloropropane | 4 | 20 Litharge | 30 | 1,610 | 2,560 | 400 |
| Do | 10 | 10 Litharge | 60 | 1,510 | 2,320 | 390 |
| Do | 2 | 20 Litharge | 30 | 1,150 | 2,360 | 460 |
| 1,1,1-Trichloropentane | 10 | 10 Litharge | 60 | 1,620 | 2,110 | 350 |
| 1,1,1-Trichloroheptane | 10 | 10 Litharge | 60 | 1,510 | 1,720 | 320 |
| 1,1,1,9-Tetrachlorononane | 10 | 10 Litharge | 60 | 940 | 2,080 | 480 |
| 1,1,1,5-Tetrachloropentane | 10 | 10 Litharge | 60 | 1,010 | 1,990 | 450 |
| 1,1,1,5-Tetrachloropentene-2 | 10 | 10 Litharge | 60 | 370 | 1,420 | 630 |
| Octachloropentadiene-1,3 | 10 | 10 Litharge | 60 | 1,550 | 2,050 | 350 |
| Hexachloroethane | 4 | 10 Litharge | 60 | 530 | 1,440 | 590 |
| Do | 10 | 10 Litharge | 60 | 900 | 1,960 | 500 |
| Hexachloropropene | 10 | 10 Litharge | 60 | 1,710 | 1,710 | 300 |
| Do | 5 | 10 Litharge | 30 | 1,000 | 1,920 | 430 |
| Telomer mixture A [1] | 5 | 10 Litharge | 60 | 1,790 | 2,560 | 380 |
| Do | 1 | 20 Litharge | 60 | 1,140 | 2,230 | 470 |
| Heptachloropropane | 10 | 10 Litharge | 60 | 1,150 | 1,680 | 370 |
| Telomer mixture B [2] | 5 | 10 Litharge | 30 | 570 | 1,320 | 500 |
| Chloropropane Wax [3] | 2 | 20 Litharge | 30 | 650 | 1,340 | 470 |
| Pentachloropropane | 10 | 10 Litharge | 60 | 480 | 1,380 | 600 |
| Pentachloroethane | 10 | 10 Litharge | 60 | 270 | 970 | 730 |
| Bromoform | 10 | 10 Litharge | 30 | 540 | 1,140 | 500 |
| Iodoform | 10 | 10 Litharge | 30 | 360 | 710 | 670 |
| Carbon tetrabromide | 10 | 10 Litharge | 30 | 1,080 | 1,850 | 420 |
| Telomer mixture A | 10 | 10 magnesia | 30 | 780 | 1,790 | 500 |
| Hexachloroethane | 10 | 10 zinc oxide | 60 | 370 | 940 | 630 |
| Do | | 10 litharge | 60 | No cure. | | |
| Do | | 10 magnesia | 60 | No cure. | | |

[1] Telomer mixture A is a mixture of compounds of the formula $Cl-(C_2H_4)_x-CCl_3$ which consists mostly of compounds where $x$ is 2 and 3.
[2] Telomer mixture B is a mixture of compounds of the above formula which consists mostly of compounds where $x$ is 4 and above.
[3] Chloropropane wax consists mostly of heptachloropropane and octachloropropane.

For the preparation of $Cl-(C_2H_4)_x-CCl_3$ compounds, see U. S. application Serial No. 438,466 (Hanford & Joyce), now U. S. Patent No. 2,440,800.

the same base stock. The halogen containing compounds were mixed into the batch, and the batch cured and tested as before. The results of these tests appear in the following table.

*Table II*

| Halogenated Hydrocarbon | Parts | Parts Litharge | Vulcanization Time, Min. | $M_{300}$, $T_B$, $E_B$ |
|---|---|---|---|---|
| 1,2,3-Tribromobutane | 10 | 10 | 30 | No cure. |
| 1,2,3,4-Tetrabromobutane | 10 | 10 | 30 | Very weak cure. |
| 1,2,3-Tribromo-2-methyl propane | 10 | 10 | 30 | No cure. |
| 1,2,3,4-Tetrachlorobutane | 10 | 10 | 60 | Do. |
| 1,2,3,3-Tetrachlorobutane | 10 | 10 | 60 | Do. |
| 1,2,2,3-Tetrachlorobutane | 10 | 10 | 60 | Very weak cure. |
| 2,2,3-Tribromobutane | 10 | 10 | 30 | No cure. |
| 1,4-Dibromobutene-2 | 10 | 10 | 30 | Very weak cure. |
| 1,2-Dibromo-1-chlorethane | 10 | 10 | 30 | No cure. |
| 3,4-Dibromohexane | 10 | 10 | 30 | Do. |
| 1,1,2,2-Tetrabromoethane | 10 | 10 | 30 | Do. |
| Hexachlorobutadiene | 4 | 10 | 30 | Do. |
| n-Butyl iodide | 10 | 10 | 30 | Do. |
| 1,1,7-Trichloroheptene | 10 | 10 | 60 | Do. |
| 1,3,3,4,5,6-Hexachlorohexane | 10 | 10 | 60 | Very weak cure. |
| Methylene iodide | 10 | 10 | 30 | Do. |

The above data show that the amount of vulcanizing agent can be varied over wide proportions, as low as 1 part for every 100 parts of elastomer sometimes being sufficient. It is also seen that, while several metal oxides will activate this class of vulcanizing agents, in general litharge is the most effective. It is seen that the metal oxides alone produce no cure under the conditions of the test.

The next example illustrates the use of the halogen containing aliphatic hydrocarbon vulcanizing agents of our invention for the vulcanization of butadiene-acrylonitrile copolymer rubbers.

EXAMPLE 3

The following stocks were mixed on a rubber mill, vulcanized for 30 minutes at 50 p. s. i. steam pressure, and then the stress-strain characteristics of the resulting vulcanizates determined.

| Stock | B | C | D |
|---|---|---|---|
| Perbunan [1] | 100 | | |
| Chemigum [1] | | 100 | |
| Hycar OR [1] | | | 100 |
| Medium processing carbon black | 50 | 50 | 50 |
| Octachloropentadiene-1, 3 | 10 | 10 | 10 |
| Litharge | 10 | 10 | 10 |
| $M_{300}$ | | 1,170 | |
| $T_B$ | 1,720 | 1,990 | 3,030 |
| $E_B$ | 270 | 430 | 280 |

[1] These are commercial butadiene rubbers prepared by copolymerizing butadiene and acrylonitrile but which contain a greater proportion of butadiene than of acrylonitrile.

EXAMPLE 4

The following stocks were mixed, vulcanized for 30 minutes at 60 p. s. i. steam pressure, and the stress-strain characteristics of the resulting vulcanizates determined.

Perbunan _____ 100 parts
Medium processing carbon black _____ 50 parts
Litharge _____ 10 parts
Vulcanizing agent _____ As indicated

Table III

| Vulcanizing Agent | Parts | $M_{300}$ | $T_B$ | $E_B$ |
|---|---|---|---|---|
| Carbon tetrabromide | 5 | 1,520 | 2,880 | 400 |
| 1,1,1,3-Tetrachloropropane | 5 | 830 | 2,430 | 510 |
| 1,1,1,9-Tetrachlorononane | 5 | 440 | 2,390 | 750 |
| Telomer Mixture B | 10 | 400 | 2,000 | 700 |
| None | | No cure. | | |

EXAMPLE 5

The following two stocks were mixed and vulcanized for 60 minutes at 60 p. s. i. steam pressure. Test strips were cut from the vulcanizates and aged for 4 days at 100° C. in a circulating air oven. Stress-strain determinations were made on the vulcanizates both before and after aging.

| Stock | E | F |
|---|---|---|
| GR-S | 100 | 100 |
| Medium processing carbon black | 50 | 50 |
| Litharge | 10 | 10 |
| 1, 1, 1, 9-Tetrachlorononane | 10 | |
| Octachloropentadiene-1,3 | | 10 |
| $M_{100}$ original | 170 | 260 |
| $M_{100}$ after aging | 370 | 410 |
| Per cent of original | 217 | 160 |
| $E_B$ original | 480 | 340 |
| $E_B$ after aging | 280 | 190 |
| Per cent of original | 58 | 56 |

Sulfur vulcanizates of butadiene-styrene copolymer rubbers are known to have poor resistance to heat aging, and this limits their usefulness for many purposes. Any method whereby this property can be improved is of considerable value. Four days at 100° C. is rather severe for sulfur vulcanizates of GR-S. Usually the 100% modulus increases 300% to 500%, and the elongation at break falls to 40%–50% of its original value. It can be seen, therefore, that vulcanizates prepared by the use of halogen containing aliphatic hydrocarbon vulcanizing agents in general give a smaller increase in modulus and a greater retention of elongation than comparable sulfur cured vulcanizates. This means that the vulcanizates of our invention will remain more flexible and serviceable at elevated temperatures than sulfur vulcanizates.

Although certain definite halogen containing aliphatic hydrocarbon vulcanizing agents have been employed in the examples, these compounds are given only to illustrate the invention, and not as limitations thereon. Other aliphatic hydrocarbon compounds containing up to 15 carbon atoms and a —$CX_3$ group in which X represents chlorine, bromine or iodine are similarly effective vulcanizing agents for butadiene copolymer rubbers. The invention is further illustrated by the following compounds, which, when used as in the specific examples, give similar results:

1,1,1-trichlorobutane
1,1,1-trichlorodecane
1,1,1,4,4,4-hexachlorobutane
Trichloro-tribromo-ethane
1,1,1-tribromopentane
1,1,1-tribromo-4-chlorobutane
1,1,1,15-tetrachloro-penta-decane and the like. Some compounds containing the —$CX_3$ group and other non-halogen substituents in the molecule are also found effective, such as 1,1,1-trichloro-pentanol-5, 1,1,1-trichloro-2-nitropropane and 1,1,1-trichloro-5-methoxy pentane.

The oxides, which are of particular importance in the invention of these new vulcanizing agents, are magnesia, zinc oxide and litharge, litharge being the preferred oxide for use in the present invention.

The halogen containing aliphatic hydrocarbon vulcanizing agent is preferably used together with a metal oxide activator. The amount of vulcanizing agent may be varied over quite wide limits, from 0.5 part to 20 parts for every 100 parts of polymer, and any amount of metal oxide can be used from 0.5 to 30 parts. The preferred range is 1 to 10 parts of vulcanizing agent and 10 to 20 parts of metal oxide. The vulcanizing agents of this invention may be used with any of the softeners, peptizing agents, fillers and other types of compounding ingredients commonly used with butadiene copolymer rubbers.

The most preferred vulcanizing agents of this class are 1,1,1,3-tetrachloropropane, 1,1,1,9-tetrachlorononane and 1,1,1,5-tetrachloropentane. The invention is applicable to butadiene rubbers containing from 50% to 98% of butadiene, but is of particular importance in the vulcanization of GR-S, that is, a butadiene/styrene copolymer containing approximately 25% of the latter.

This invention provides an entirely new method for vulcanizing butadiene copolymer rubbers which enables departure from the use of sulfur, oxidizing agents and other similar vulcanizing agents which often are deleterious to the properties of the vulcanizates produced. By the use of these new vulcanizing agents, it may be possible to produce vulcanizates which have greater usefulness in many fields than the present sulfur vulcanizates.

I claim:

1. A process of vulcanizing butadiene copolymer rubbers of the class consisting of copolymers of 1,3-butadiene and styrene and the copolymers of 1,3-butadiene and acrylonitrile and in the absence of sulfur which comprises incorporating in the unvulcanized copolymer material from 0.5 to 20 parts, per 100 parts of copolymer, of an aliphatic hydrocarbon compound containing not more than 15 carbon atoms and at least one —$CX_3$ group in which X represents a halogen of the group consisting of chlorine, bromine and iodine, and from 0.5 to 30 parts of a metal oxide of the group consisting of magnesia, zinc oxide and litharge, and heating the mass to effect vulcanization of the copolymer.

2. A process of vulcanizing butadiene copolymer rubbers of the class consisting of copolymers of 1,3-butadiene and styrene and the copolymers of 1,3-butadiene and acrylonitrile and in the absence of sulfur which comprises incorporating in the unvulcanized copolymer material from 1 to 10 parts, per 100 parts of copolymer, of an aliphatic hydrocarbon compound containing not more than 15 carbon atoms and at least one —$CX_3$ group in which X represents a halogen of the group consisting of chlorine, bromine and iodine, and from 10 to 20 parts of a metal oxide of the group consisting of magnesia, zinc oxide and litharge, and heating the mass to effect vulcanization of the copolymer.

3. A process of vulcanizing butadiene copolymer rubbers of the class consisting of copolymers of 1,3-butadiene and styrene and the copolymers of 1,3-butadiene and acrylonitrile and in the absence of sulfur which comprises incorporating in the unvulcanized copolymer material from 1 to 10 parts, per 100 parts of copolymer, of an aliphatic hydrocarbon compound containing not more than 15 carbon atoms and at least one —$CX_3$ group in which X represents a halogen of the group consisting of chlorine, bromine and iodine, and from 10 to 20 parts of litharge, and heating the mass to effect vulcanization of the copolymer.

4. A process of vulcanizing butadiene copolymer rubbers of the class consisting of copolymers of 1,3-butadiene and styrene and the copolymers of 1,3-butadiene and acrylonitrile and in the absence of sulfur which comprises incorporating in the unvulcanized copolymer material from 1 to 10 parts of 1,1,1,3-tetrachloropropane and 10 to 20 parts of litharge, per 100 parts of copolymer, and heating the mass to effect vulcanization of the copolymer.

5. A process of vulcanizing butadiene copolymer rubbers of the class consisting of copolymers of 1,3-butadiene and styrene and the copolymers of 1,3-butadiene and acrylonitrile and in the absence of sulfur which comprises incorporating in the unvulcanized copolymer material from 1 to 10 parts of 1,1,1,9-tetrachlorononane and 10 to 20 parts of litharge, per 100 parts of copolymer, and heating the mass to effect vulcanization of the copolymer.

6. A process of vulcanizing butadiene copolymer rubbers of the class consisting of copolymers of 1,3-butadiene and styrene and the copolymers of 1,3-butadiene and acrylonitrile and in the absence of sulfur which comprises incorporating in the unvulcanized copolymer material from 1 to 10 parts of 1,1,1,5-tetrachloropentane and 10 to 20 parts of litharge, per 100 parts of copolymer, and heating the mass to effect vulcanization of the copolymer.

7. A vulcanized butadiene copolymer rubber obtained by the process of claim 1.

8. A vulcanized butadiene copolymer rubber obtained by the process of claim 4.

9. A vulcanized butadiene copolymer rubber obtained by the process of claim 5.

10. A vulcanized butadiene copolymer rubber obtained by the process of claim 6.

ARTHUR A. BAUM.

No references cited.

Certificate of Correction

Patent No. 2,478,036

August 2, 1949

ARTHUR A. BAUM

It is hereby certified that errors appear in the printed specification of the above numbered patent requiring correction as follows:

Columns 3 and 4, Table I, first column, last two lines thereof, strike out "Do" in each occurrence and insert instead leaders;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*